March 13, 1962    J. G. R. LASNIER    3,024,888
CONVEYORS
Filed April 6, 1959    2 Sheets-Sheet 1

Inventor
Joseph Georges Raymond Lasnier
By Stevens Davis Miller & Mosher
Attorneys March 13, 1962 J. G. R. LASNIER 3,024,888
CONVEYORS Filed April 6, 1959 2 Sheets-Sheet 2

Inventor
Joseph Georges Raymond Lasnier
By Stevens Davis Miller & Mosher
Attorneys

3,024,888
CONVEYORS
Joseph Georges Raymond Lasnier, Paris, France, assignor to Societe: Brodard et Taupin, Paris, France, a French corporation
Filed Apr. 6, 1959, Ser. No. 804,362
Claims priority, application France Feb. 11, 1959
1 Claim. (Cl. 198—29)

The present invention relates to conveyors and has specific reference to improved means for transporting by means of travelling belts or the like flat or similar objects disposed edgewise so as to bear or lean against one another.

There are frequent cases in which it is necessary and/or advantageous to cause flat objects to be transported edgewise so as to bear against one another, notably for feeding machines adapted to perform one or more specific operations on one or more edges of these objects. To this end, a conventional-type belt conveyor or the like may also be used, but a serious difficulty arises as to the provision of detachable bearing elements at the end of a row of these objects for maintaining the stability of this row.

These specific conditions may occur for example in the handling of flat boxes, books, plates or similar articles.

Now it is the object of this invention to permit this handling under very satisfactory conditions, and to this end the present invention consists of an improved conveyor providing a concave path for transporting the objects. This conveyor, which may be of the band or belt type, and preferably of the multiple belt type, consists of a number of sections constituting, in the longitudinal direction of the conveyor, a concave polygonal-sectioned path raised at both ends, so that the objects of the row supported thereby bear against one another and toward the trough of the path, thus receiving the desired stability from the conveyor itself.

According to another feature of this invention, the various sections of the conveyor may be driven at different speeds in order to produce for example a certain compression of the objects against one another with a view to improve the desired stability and, possibly, the proper accomplishment of the operations to be performed on these objects which are therefore adequately clamped or pressed against one another.

A conveyor according to this invention is also advantageous in that it facilitates greatly the use of automatic loading and unloading means, if necessary.

A typical form of embodiment of a conveyor constructed according to the teachings of this invention will now be described by way of example with reference to the accompanying drawings. In the drawings.

Figure 1:
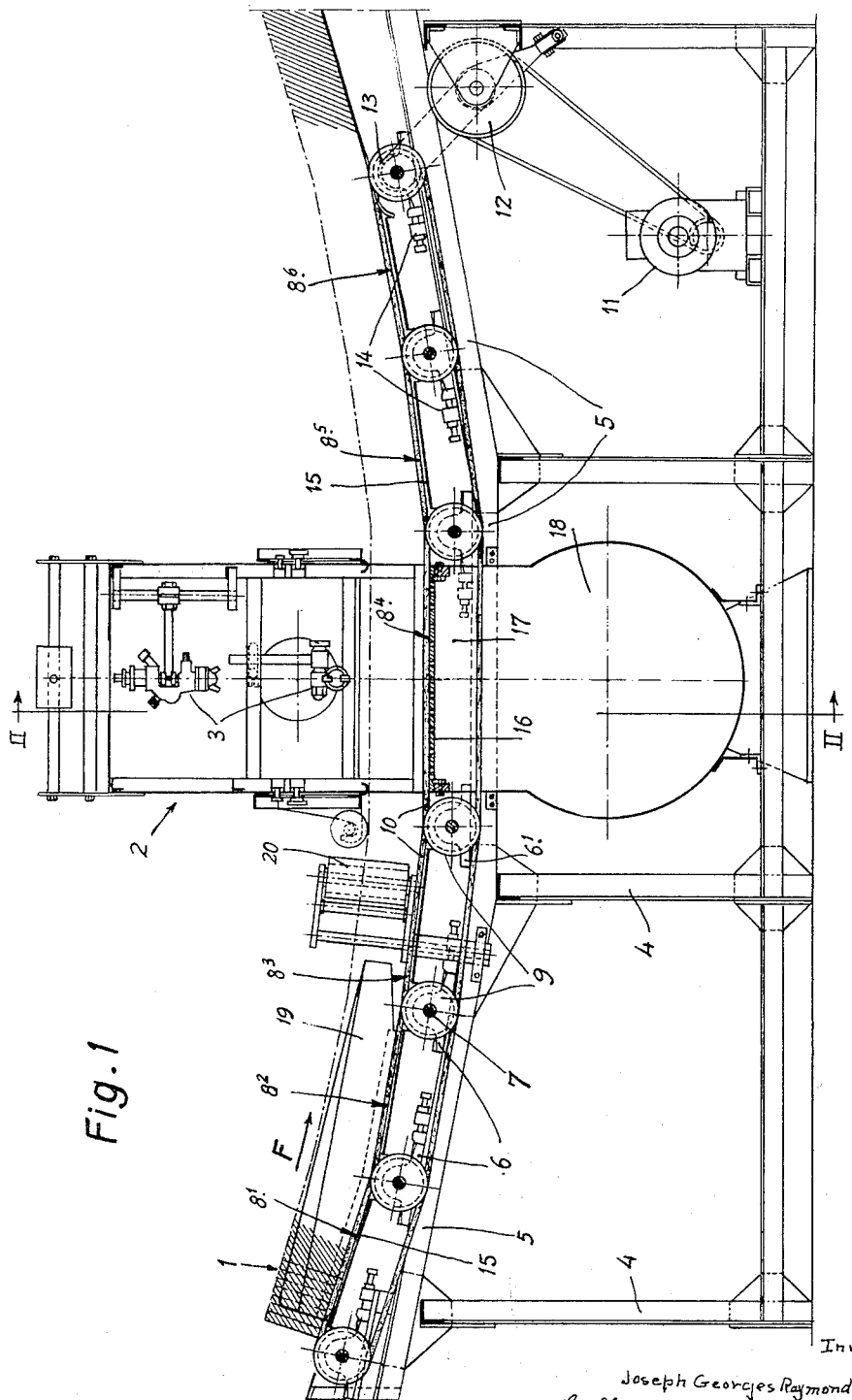
FIGURE 1 is a longitudinal section showing an installation.

In the installation illustrated in the drawings the conveyor of the belt type is adapted to transfer books 1 during their manufacture into a cage 2 overlying the conveyor and arranged in the known fashion for spraying colours onto the edges of the books by means of spray guns 3 enclosed in said cage.

The frame structure of the installation consists essentially of the conveyor frame structure and comprises a metal framework of which the post 4 support longitudinal angle members 5 adapted to support in turn the bearings 6 in which the shafts of the belt pulleys 7 are journalled.

These angle members 5 are supported horizontally in the central portion of the conveyor corresponding to the operating cage 2, and somewhat obliquely in the longitudinal direction of the conveyor on either side of this central portion.

To this end, the path of the belt conveyor consists in its longitudinal direction of a number of sections, in the case illustrated six sections $8^1$ to $8^6$, every pair of adjacent sections having a common pulley axis; the assembly constitute, according to this invention, a continuous path having a polygonal cross-section raised at either ends, the books or like flat articles being caused to travel thereon in the form of a concave row and having their backs resting on the belts.

Each pulley shaft 7 common to a pair of adjacent sections has the pulleys 9 so arranged thereon that the pulley of any pair belong each to a different section, the belts 10 which passes thereover extending alternately in one and the other direction at the junction of two adjacent sections of the conveyor.

Figure 2:
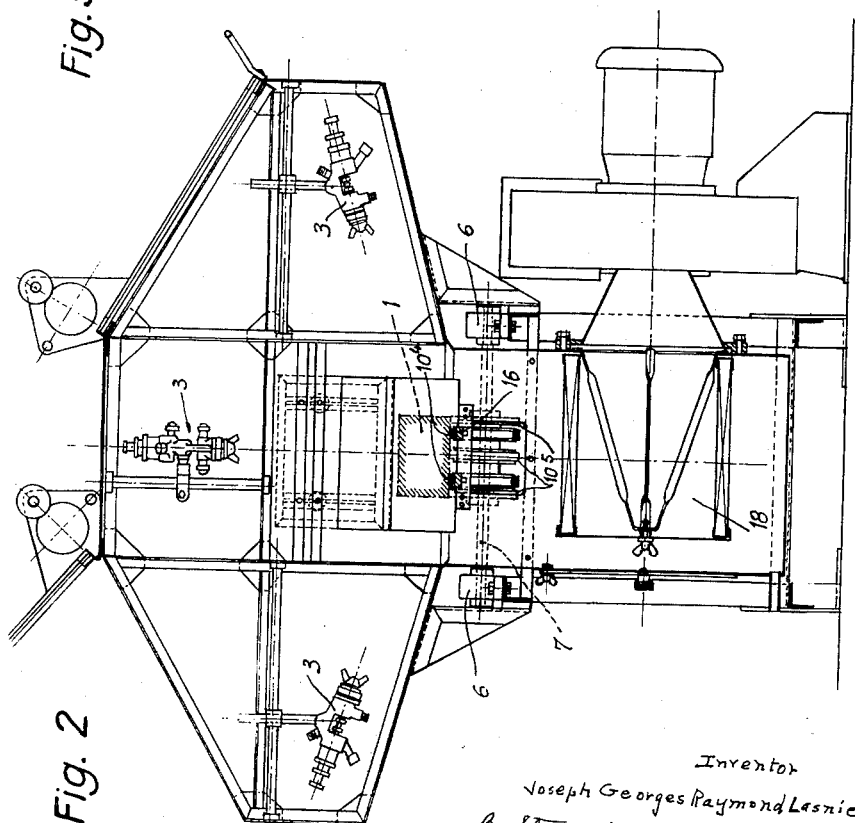
FIGURE 2 is a cross-section taken upon the line II—II of FIG. 1.

This arrangement is clearly shown in FIG. 2; in this example, the intermediate section $8^4$ comprises two belts designated by the reference numerals $10^4$, whereas the section $8^5$ comprises three belts $10^5$, the corresponding pulleys being shown at $9^4$ and $9^5$. Therefore, the sections comprises alternately two and three belts throughout the path of the conveyor.

The conveyor is driven at a suitable velocity from an electromotor 11 associated with a reducing gear and adapted to drive through a transmission 12 a toothed wheel 13 keyed on the last pulley shaft 7 in relation to the direction of travel of the conveyor, which is designated by the arrow F in FIG. 1.

This transmission is suitable for driving the different sections constituting the conveyor, that is, subsequently utilizing the belts 10 of these sections, their pulleys 9 being keyed on their shafts and the bearings 6 of these shafts being adjustable for example in relation to the bearing $6^1$ with a view to ensure a proper belt tension and a uniform linear speed. As shown in FIG. 1, screw and nut devices 14 may be provided for adjusting and locking the bearings in the proper positions along the angle members 5.

In order to limit the sagging of the belts due to the weight of the articles carried by each section, plates 15 may be disposed under the path constituted by these belts, these plates being supported by lateral brackets secured on the angle members 5 between the bearings 6. However, in the central section $8^4$ corresponding to the operating cage 2 the belts $10^4$ slide in guide members 16 supported by a casing 17 secured on the frame of the installation under the cage, a motor-driven vacuum and filter assembly 18 being connected to this casing 17 in order to preserve the health of the operator.

FIGURE 1 also shows the means provided for guiding the books laterally before they enter the operating cage, these means consisting in this example of longitudinal plates 19 adjustable in position on the plates 15 and of a swivelling roller device 20.

From the foregoing it is clear that this conveyor arrangement and more particularly its polygonal shaped path raised at its ends imparts a proper stability to the rows of books circulating under the conditions set forth hereinabove, this row being formed if desired when starting the installation and before passing through the cage 2 against a detachable support disposed in this path and becoming useless as the travelling books engage the ascending portion of the path towards the exit end of the conveyor.

In the case of book handling for example this arrangement is particularly advantageous because the books are slightly thicker along their back, so that the travelling books may be easily maintained under a certain pressure.

These conditions may be further improved by driving the different sections or groups of sections of the conveyors at different speeds.

Thus, with decreasing speeds in the downstream direction and as already set forth the objects will be properly pressed against one another.

This condition may be obtained for example without difficulty in the case of the installation described hereinabove by keying the downstream pulleys on their shafts in each section and mounting the relevant upstream pulleys for loose rotation on their shafts, as well as by providing between the shafts of these pulleys chain-and-sprocket transmissions adapted to introduce different transmission ratios between the sections of the conveyor.

Figure 3:
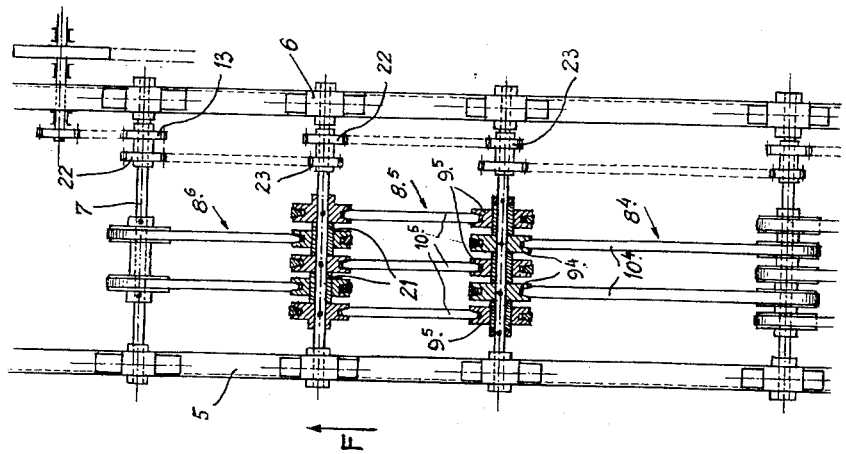
FIGURE 3 is a fragmentary plane view from above showing the conveyor path to illustrate a typical way of driving the different sections thereof at different speeds.

An arrangement of this character is illustrated in FIG. 3 showing the exit or discharge end of the conveyor, where the downstream pulleys of the different sections are keyed on their shafts, whereas the upstream pulleys are mounted for loose rotation on bushings 21 acting at the same time as spacers between the co-axial pulleys. Moreover, each pulley shaft carries a sprocket 22 connected through a chain to a smaller sprocket 23 keyed on the preceding shaft, whereby the different sections of the conveyor may be driven at the selected decreasing speeds.

In certain cases, if desired, only one portion of the conveyor may be driven at a higher speed, for example the inlet portion or the central portion.

It will be readily understood by anybody conversant with the art that, although a belt-type conveyor is preferred for carrying out this invention, this invention is also applicable to any other similar embodiments of a conveyor divided into a plurality of sections for creating a circulation of objects along a concave or trough-like path, notably to band-conveyors, in which breaks may be provided between adjacent bands, without interfering with the same circulation of the objects.

While only two specific forms of embodiment of the invention have been shown and described herein, it will be readily appreciated by anybody conversant with the art that many modifications may be brought thereto without departing from the spirit and scope of the invention as set forth in the appended claim.

I claim:

A conveyor for conveying flat objects in upright positions, one resting against another, past a station for treating their top edges, said conveyor comprising a central treating station having an endless belt section thereon, horizontal supporting guide means at said central treating station underlying and slidably supporting the top portion of said belt section, upwardly inclined outer endless belt sections extending from each end of the central section and being substantially in longitudinal alignment therewith, and means driving the belt sections in the same direction at speeds decreasing from upstream to downstream of the central section, whereby the objects at the upstream portion of the conveyor are driven more rapidly than the objects at the downstream portion and whereby the objects are clamped together in upright positions as they pass on the central section past the treating station while at the same time their stability over the entire course of the conveyor is assured.

References Cited in the file of this patent

UNITED STATES PATENTS

| | | |
|---|---|---|
| 1,689,201 | Halter | Oct. 30, 1928 |
| 2,847,110 | Rysti | Aug. 12, 1958 |

FOREIGN PATENTS

| | | |
|---|---|---|
| 932,419 | Germany | Sept. 1, 1955 |